US012436699B2

(12) United States Patent
Ietomi et al.

(10) Patent No.: US 12,436,699 B2
(45) Date of Patent: Oct. 7, 2025

(54) INTEGRATED CIRCUIT DATA STREAM PROCESSING USING PAGED BUFFERING

(71) Applicant: EDGECORTIX INC., Tokyo (JP)

(72) Inventors: Kunihiko Ietomi, Kanagawa (JP); Nikolay Nez, Tokyo (JP); Oleg Khavin, Tokyo (JP); Sakyasingha Dasgupta, Tokyo (JP)

(73) Assignee: EDGECORTIX INC., Tokyo (JP)

( * ) Notice: Subject to any disclaimer, the term of this patent is extended or adjusted under 35 U.S.C. 154(b) by 50 days.

(21) Appl. No.: 18/589,430

(22) Filed: Feb. 28, 2024

(65) Prior Publication Data
US 2024/0385761 A1 Nov. 21, 2024

Related U.S. Application Data

(60) Provisional application No. 63/502,417, filed on May 16, 2023.

(51) Int. Cl.
G06F 3/00 (2006.01)
G06F 3/06 (2006.01)

(52) U.S. Cl.
CPC ............ G06F 3/064 (2013.01); G06F 3/0604 (2013.01); G06F 3/0673 (2013.01)

(58) Field of Classification Search
None
See application file for complete search history.

(56) References Cited

U.S. PATENT DOCUMENTS

| 2014/0136773 | A1 | 5/2014 | Michalak |
| 2020/0081774 | A1 | 3/2020 | Kumano et al. |
| 2022/0188222 | A1* | 6/2022 | Hashimoto ......... G06F 12/0261 |
| 2022/0382478 | A1 | 12/2022 | Park et al. |

FOREIGN PATENT DOCUMENTS

| JP | 2008146253 A | 6/2008 |
| JP | 2015534200 A | 11/2015 |
| JP | 2020042512 A | 3/2020 |

OTHER PUBLICATIONS

Morris et al., "Credit-Based Flow Control for ATM Networks" IEEE Network, vol. 9, No. 2, Mar./Apr. 1995, pp. 40-48, 11pp.
Towles et al., "Route Packets, Not Wires: On-Chip Interconnection Networks" 38th Design Automation Conference, 2001, 6pp.

* cited by examiner

*Primary Examiner* — Midys Rojas
(74) *Attorney, Agent, or Firm* — HAUPTMAN HAM, LLP

(57) ABSTRACT

Integrated circuit data stream processing utilizing paged buffering is performed by an integrated circuit that includes an upstream random access memory, a local read counter, a downstream random access memory, a local write counter, and a processor. The local read counter is configured to store a value indicating whether any accessible blocks of data are stored in the upstream memory. The local write counter is configured to store a value indicating whether any downstream pages of the downstream memory are available for recording. The processor is configured to adjust the local read counter to indicate a page release, adjust the local write counter to indicate a page occupy, read a first block of data recorded to the upstream memory, process the first block of data to produce a second block of data, and record the second block of data to the downstream memory.

20 Claims, 12 Drawing Sheets

INTEGRATED CIRCUIT DATA STREAM PROCESSING USING PAGED BUFFERING

CROSS-REFERENCE TO RELATED APPLICATIONS

The present application claims priority to Provisional Application No. 63/502,417, filed May 16, 2023, the contents of which are hereby incorporated by reference herein in their entirety.

BACKGROUND

Wireless data communication has become ubiquitous in modern society. As digital data transmission became more prevalent, the utility of reliable and error-free communication over noisy wireless channels became apparent. This led to the creation of forward error correction (FEC) codes. FEC codes are mathematical algorithms used to add redundant information to transmitted data, allowing the receiver to correct errors that may occur during transmission. FEC codes became essential as wireless communication systems expanded, especially with the advent of mobile phones and data-intensive applications. Without FEC, wireless data transmission would suffer from higher error rates, leading to data corruption and costly retransmissions. FEC codes, like Low-Density Parity-Check (LDPC) codes, are integral components of modern wireless technologies, improving data integrity and reducing the impact of channel impairments, making wireless communication reliable and efficient.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
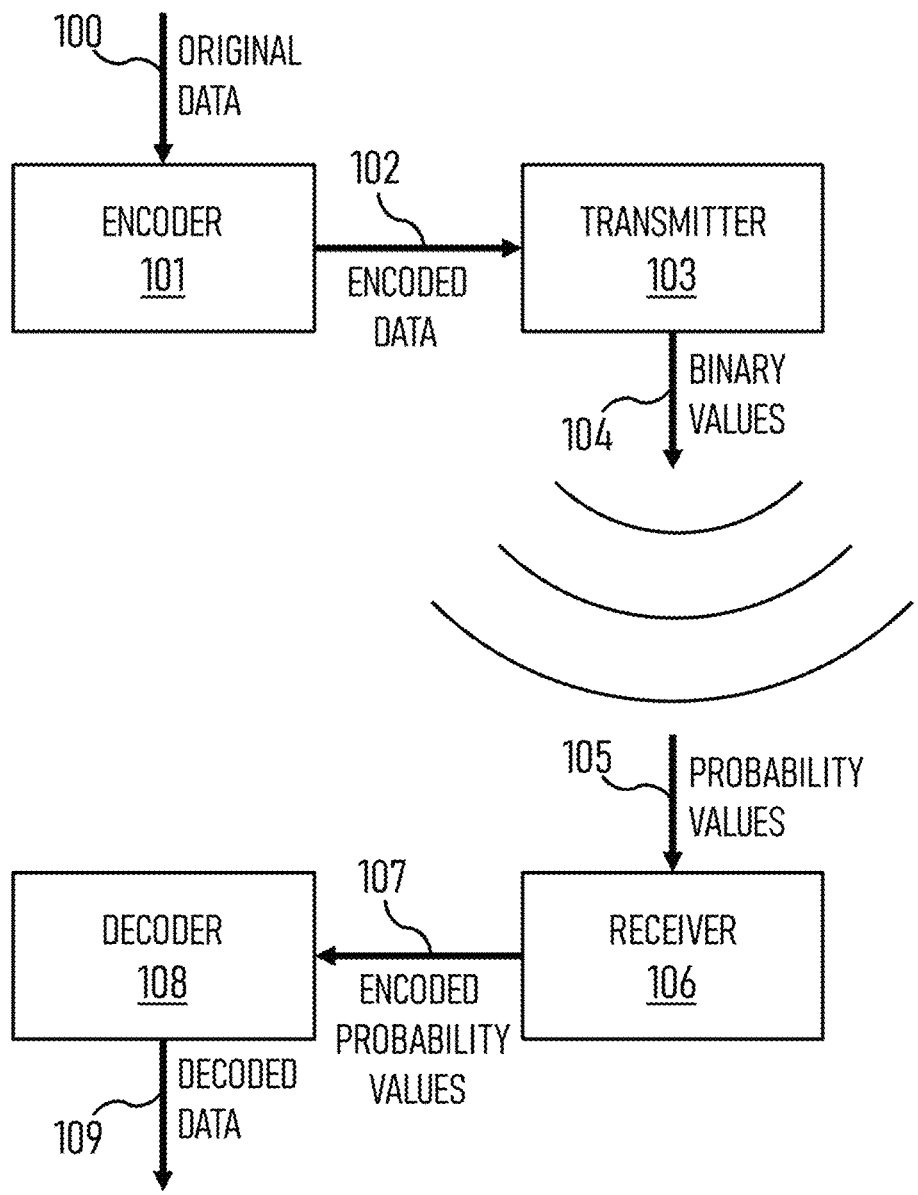
FIG. 1 is a schematic diagram of a system for Low-Density Parity-Check (LDPC) data transmission, according to at least one embodiment of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Efficient decoding of data encoded with FEC codes plays a crucial role in the spread of wireless communication to the vast and diverse array of connected devices, many of which have limited power and processing capabilities, such as IoT (Internet of Things) devices.

FIG. 1 is a schematic diagram of a system for Low-Density Parity-Check (LDPC) data transmission, according to at least one embodiment of the present invention. The system includes an encoder 101, a transmitter 103, a receiver 106, and a decoder 108. In at least some embodiments, encoder 101 and transmitter 103 are parts of a single device, such as a transmission tower of a radio access network. In at least some embodiments, receiver 106 and decoder 108 are parts of a single device, such as a smartphone in communication with a radio access network. In at least some embodiments, such single devices have an encoder, a transmitter, a receiver, and a decoder, enabling bi-directional communication. In FIG. 1, because transmitter 103 is in direct communication with receiver 106, encoder 101 and transmitter 103 would not be part of the same device as receiver 106 and decoder 108.

Encoder 101 is configured to receive original data 100, and to transmit encoded data 102 to transmitter 103. In at least some embodiments, encoder 101 is configured to receive original data 100 in blocks of one or more predetermined lengths. In at least some embodiments, encoder 101 is configured to apply FEC encoding to original data 100 to produce encoded data 102. In at least some embodiments, encoder 101 is configured to apply LDPC encoding to original data 100 to produce encoded data 102. In at least some embodiments, encoder 101 is an integrated circuit, such as a Field-Programmable Gate Array (FPGA), Application Specific Integrated Circuit (ASIC), etc. In at least some embodiments, encoder 101 is a computer having a processor and a memory storing instructions for execution by the processor.

Transmitter 103 is configured to receive encoded data 102 from encoder 101, and to transmit binary values 104 of encoded data 102 to receiver 106 through wireless communication. In at least some embodiments, transmitter 103 is configured to transmit encoded data 102 in blocks of one or more predetermined lengths. In at least some embodiments, transmitter 103 is configured to transmit binary values 104 according to a standard wireless protocol, such as 5G, BLUETOOTH, BLE, WiFi, 3G GPRS, 3G EVDO, 3G HSPA, 4G WiMAX, 4G E-UTRAN (LTE), etc. Although not all of the foregoing standards currently utilize LDPC, such as 3G and 4G, transmitter 103 includes configuration for multiple standard wireless protocols in at least some embodiments. In at least some embodiments, transmitter 103 is configured to transmit at a frequency and a timing scheme according to a standard wireless protocol. In at least some embodiments, transmitter 103 is configured to transmit binary values 104 through a data channel, and to transmit other information for decoding encoded data 102, such as information representing a parity-check matrix, through a control channel.

Receiver 106 is configured to receive probability values 105 through wireless reception, and to transmit encoded probability values 107 to decoder 108. In at least some embodiments, receiver 106 is configured to record probability values 105 in attempting to receive binary values 104, probability values 105 representing one or more probabilities of whether a received binary value represents a one or a zero from the transmission of binary values 104 as transmitted by transmitter 103. In at least some embodiments, receiver 106 records probability values having a confidence proportional to a signal-to-noise ratio during reception. In at least some embodiments, receiver 106 is configured to record more confident probability values during instances of higher signal-to-noise ratios, and less confident probability values during instances of lower signal-to-noise ratios. In at least some embodiments, the received values are represented as follows:

$$z_i = y_i + n_i \qquad \text{EQ. 1}$$

where $z_i$ represents the received values, $y_i$ represents the transmitted values, $n_i$ represents the Additive White Gaussian Noise (AWGN), and i is 1 to N, where N is the quantity of encoded probability values received. In at least some embodiments, receiver 106 converts the received values into the Log-Likelihood Ratio (LLR) domain as follows:

$$LLR(z_i) = \log\left(\frac{p(z_i \mid y_i = 0)}{p(z_i \mid y_i = 1)}\right) \qquad \text{EQ. 2}$$

where $p(z_i|y_i=0)$ is the probability that the received value is zero, and $p(z_i|y_i=1)$ is the probability that the received value is one. In at least some embodiments, use of LLR values allows probability values to be added, and the absolute value of LLR indicates confidence of the probability.

In at least some embodiments, receiver 106 is configured to use multiple bits of data to record one or more probability values among probability values 105 corresponding to one binary value among binary values 104. In at least some embodiments, the number of bits of data used to record each probability value among probability values 105 depends on the hardware capabilities of receiver 106 or decoder 108. In at least some embodiments, receiver 106 is configured to use six bits of data to record one or more probability values among probability values 105 corresponding to one binary value among binary values 104. In at least some embodiments, receiver 106 is configured to receive probability values 105 in blocks of one or more predetermined lengths. In at least some embodiments, receiver 106 is configured to assemble probability values 105 into encoded probability values 107 using a format that clarifies correspondence between probability values among encoded probability values 107 and binary values among encoded data 102. In at least some embodiments, receiver 106 is configured to receive probability values 105 through a data channel, and to receive other information for decoding encoded data 102, such as information representing a parity-check matrix, through a control channel.

Decoder 108 is configured to receive encoded probability values 107 from receiver 106, and to output decoded data 109. In at least some embodiments, decoder 108 is configured to decode encoded probability values 107 into decoded data 109. In at least some embodiments, decoder 108 is configured to apply FEC decoding to encoded probability values 107 to produce decoded data 109. In at least some embodiments, decoder 108 is configured to apply LDPC decoding to encoded probability values 107 to produce decoded data 109. In at least some embodiments, decoder 108 is an integrated circuit, such as an FPGA, ASIC, etc. In at least some embodiments, decoder 108 is a computer having a processor and a memory storing instructions for execution by the processor.

Figure 2:
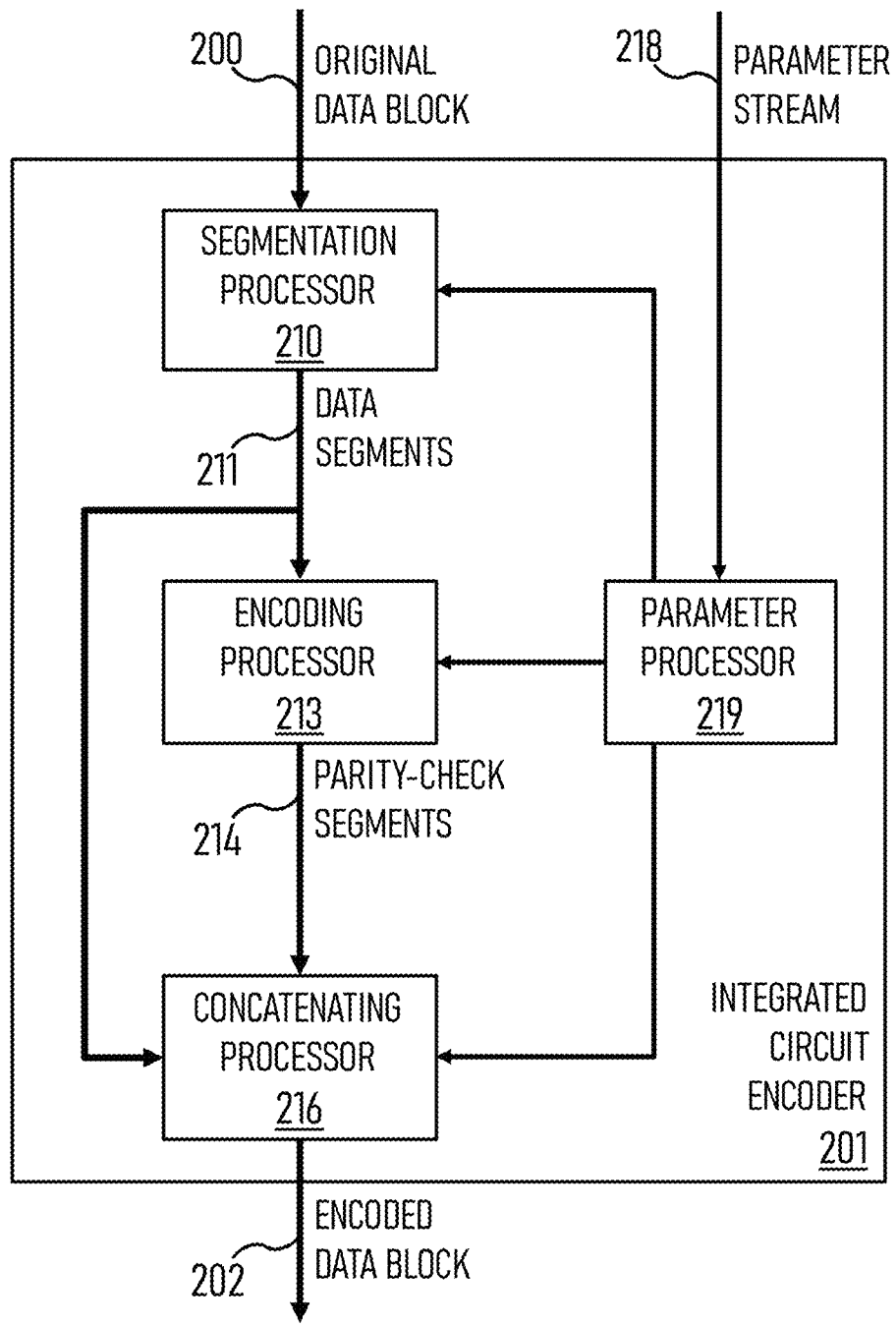
FIG. 2 is a schematic diagram of an integrated circuit encoder for LDPC data encoding, according to at least one embodiment of the present invention.

FIG. 2 is a schematic diagram of an integrated circuit encoder 201 for LDPC data encoding, according to at least one embodiment of the present invention. Integrated circuit encoder 201 includes segmentation processor 210, encoding processor 213, concatenating processor 216, and parameter processor 219.

Segmentation processor 210 is configured to receive original data block 200, and to transmit data segments 211 to encoding processor 213 and concatenating processor 216. In at least some embodiments, segmentation processor 210 is configured to divide an original block of data into a plurality of data segments. In at least some embodiments, segmentation processor 210 is configured to divide original data block 200 into segments of one or more predetermined lengths. In at least some embodiments, segmentation processor 210 is configured to divide original data block 200 into segments having a length according to the length of original data block 200. In at least some embodiments, segmentation processor 210 is configured to divide an original block of data into a plurality of data segments in accordance with columns of an LDPC base graph. In at least some embodiments, original data block 200 corresponds to an "information block" in the 5G standard, the information block being the result of prior segmentation, which is not performed by segmentation processor 210, of a transport block.

Encoding processor 213 is configured to receive data segments 211, and to transmit parity segments 214 to concatenating processor 216. In at least some embodiments, encoding processor 213 is configured to apply a parity-check matrix to data segments 211 to produce parity segments 214. In at least some embodiments, encoding processor 213 is configured to apply an LDPC parity-check matrix to data segments 211 to produce parity segments 214. In at least some embodiments, encoding processor 213 is configured to apply one or more circular shifts to each data segment 211 according to the parity-check matrix to produce parity segments 214. In at least some embodiments, encoding processor 213 is configured to apply one or more circular shifts to some parity segments, such as "core" parity segments, among parity segments 214 according to the parity-check matrix to produce other parity segments among parity segments 214. In at least some embodiments, encoding processor 213 is configured to populate each bit of each parity segment with values such that a sum total of the bit and binary values in a subset of values of one or more data segments and other parity segments corresponding to the bit is even.

Concatenating processor 216 is configured to receive data segments 211 and parity segments 214, and to output encoded data block 202. In at least some embodiments, concatenating processor 216 is configured to concatenate data segments 211 with parity segments 214 to produce encoded data block 202. In at least some embodiments, concatenating processor 216 is configured to concatenate data segments 211 with parity segments 214 into a format that clarifies correspondence between subsets of values of data segments 211 and parity segments 214.

Parameter processor 219 is configured to receive parameter stream 218, and transmit information to segmentation processor 210, encoding processor 213, and concatenating processor 216. In at least some embodiments, parameter processor 219 is configured to receive parameter stream 218 through a control channel. In at least some embodiments, parameter processor 219 is configured to receive information representing a parity-check matrix corresponding to original data block 200 within parameter stream 218. In at least some embodiments, parameter processor 219 is configured to transmit relevant parameters to each of segmentation processor 210, encoding processor 213, and concatenating processor 216. In at least some embodiments, parameter processor 219 is configured to transmit information representing a segment size to segmentation processor 210. In at least some embodiments, parameter processor 219 is configured to transmit information representing the parity-check matrix corresponding to original data block 200 to encoding processor 213. In at least some embodiments, parameter processor 219 is configured to transmit information representing the parity-check matrix corresponding to original data block 200 to concatenating processor 216.

Figure 3:
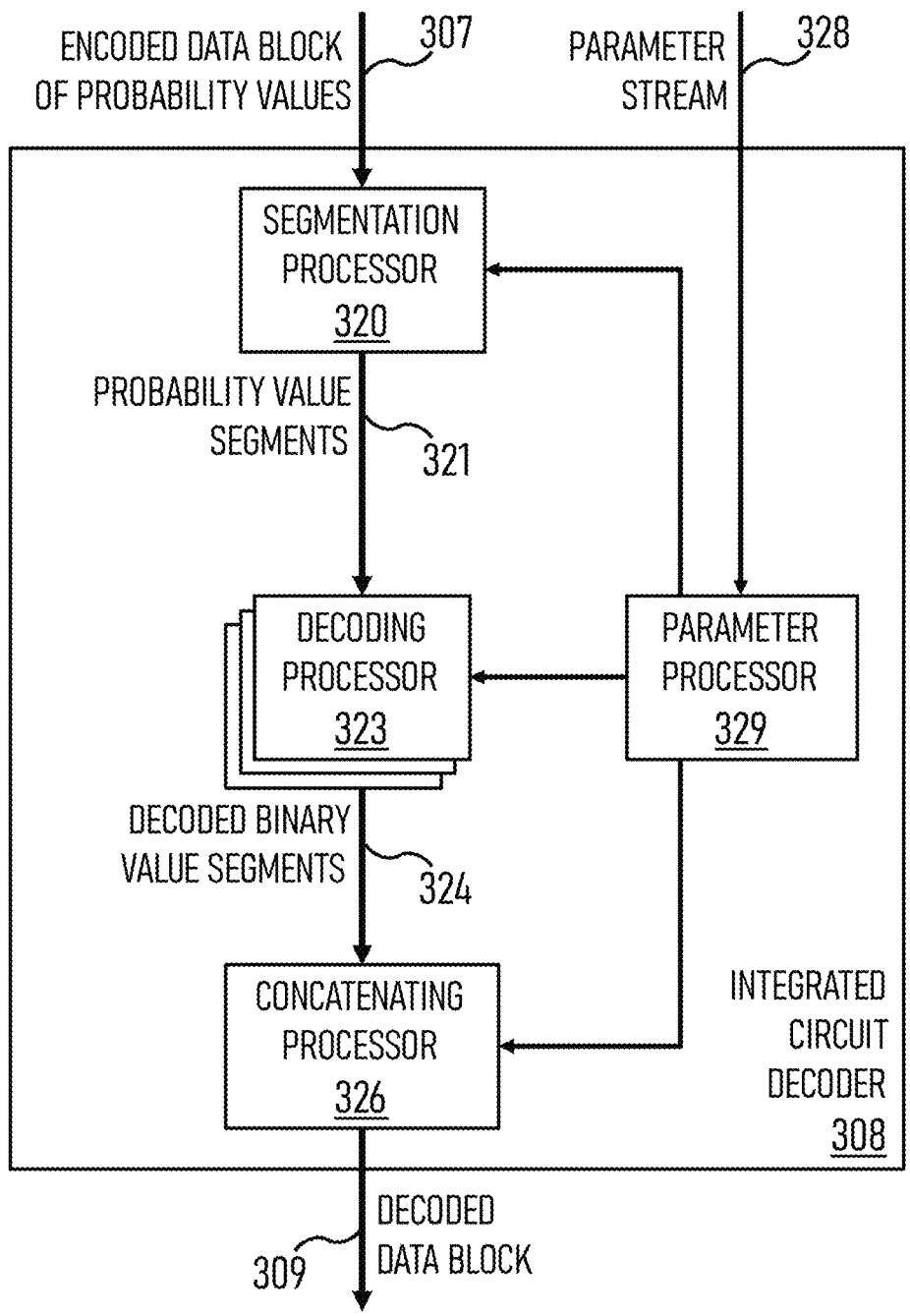
FIG. 3 is a schematic diagram of an integrated circuit decoder for LDPC data decoding, according to at least one embodiment of the present invention.

FIG. 3 is a schematic diagram of an integrated circuit decoder 308 for LDPC data decoding, according to at least one embodiment of the present invention. Integrated circuit decoder 308 includes segmentation processor 320, one or more decoding processors 323, concatenating processor 326, and parameter processor 329.

Segmentation processor 320 is configured to receive encoded data block of probability values 307, and to transmit probability value segments 321 to decoding processors 323. In at least some embodiments, probability value segments 321 includes data probability value segments and parity probability value segments. In at least some embodiments, segmentation processor 320 is configured to divide an encoded data block of probability values into a plurality of data probability value segments and a plurality of parity probability value segments, each probability value of the encoded data block representing a likelihood between binary values. In at least some embodiments, segmentation processor 320 is configured to divide encoded data block of probability values 307 into segments of one or more predetermined lengths. In at least some embodiments, segmentation processor 320 is configured to divide encoded data block of probability values 307 into segments having a length according to the length of encoded data block of probability values 307.

Decoding processors 323 are each configured to receive probability value segments 321, and to transmit decoded binary value segments 324 to concatenating processor 326. In at least some embodiments, each decoding processor 323 is configured to adjust, according to an iteration-variable accuracy parameter, probability values of the encoded data block based on a parity-check matrix, the parity-check matrix defining correspondence among data probability value segments and parity probability value segments, wherein the iteration-variable accuracy parameter represents a tradeoff between accuracy and computational efficiency. In at least some embodiments, decoding processors 323 are each configured to apply a parity-check matrix to probability value segments 321 to produce decoded binary value segments 324. In at least some embodiments, decoding processors 323 are each configured to apply an LDPC parity-check matrix to probability value segments 321 to produce decoded binary value segments 324. In at least some embodiments, decoding processors 323 are each configured to apply one or more circular shifts to each data probability value segment and each parity probability value segment among probability value segments 321 according to the parity-check matrix to produce decoded binary value segments 324. In at least some embodiments, decoding processors 323 are each configured to compare binary values in a subset of values of corresponding data probability value segments and parity probability value segments to ensure that a sum total of the values is even. In at least some embodiments, each of decoding processors 323 includes a sorter for sorting probability values into segments and finding the minimum value(s), a calculator for calculating update values from the minimum value(s), a function selector for selecting the correct function for determining an adjustment amount based on the minimum value(s), and an accuracy parameter selector for selecting the iteration-variable accuracy parameter.

Concatenating processor 326 is configured to receive decoded binary value segments 324, and to output decoded data block 309. In at least some embodiments, concatenating processor 326 is configured to concatenate the likely binary values that satisfy the parity-check matrix associated with the probability values of each data probability value segment to form a decoded data block. In at least some embodiments, concatenating processor 326 is configured to concatenate decoded binary value segments 324 to produce decoded data block 309. In at least some embodiments, concatenating processor 326 is configured to concatenate decoded binary value segments 324 into a format identical to the original block of data.

Parameter processor 329 is configured to receive parameter stream 328, and transmit information to segmentation processor 320, decoding processors 323, and concatenating processor 326. In at least some embodiments, parameter processor 329 is configured to transmit a plurality of parameters to each of the segmentation processor, the decoding processor, and the concatenating processor, wherein the plurality of parameters corresponds to the encoded data block. In at least some embodiments, parameter processor 329 is configured to receive parameter stream 328 through a control channel. In at least some embodiments, parameter processor 329 is configured to receive information representing a parity-check matrix corresponding to encoded data block of probability values 307 within parameter stream 328. In at least some embodiments, parameter processor 329 is configured to transmit relevant parameters to each of segmentation processor 320, decoding processors 323, and concatenating processor 326. In at least some embodiments, parameter processor 329 is configured to transmit information representing a segment size to segmentation processor 320. In at least some embodiments, parameter processor 329 is configured to transmit information representing the parity-check matrix corresponding to encoded data block of probability values 307 to decoding processors 323. In at least some embodiments, parameter processor 329 is configured to transmit information representing the parity-check matrix corresponding to encoded data block of probability values 307 to concatenating processor 326.

In general, performing tasks in parallel increases decoding efficiency. At least some integrated circuits configured to decode data include multiple processors, each performing a different task to process a data block, the data of which is processed by each processor in a sequence. In response to a processor completing a task, the processor checks for the next data block from the upstream processor.

In at least some integrated circuits, a buffer, such as a First-In-First-Out (FIFO) unit, is used to hold a data block processed by an upstream processor until an instant processor is ready. However, in order to ensure that the data held by a FIFO unit is ready, the instant processor checks a flag of the FIFO. Before processing the data held by the FIFO unit, the instant processor also checks another flag of a downstream FIFO to verify that the downstream FIFO is ready for storing output data. At least some of such verification processes last multiple clock cycles because of delay in flag updates. Most FIFO units are not designed for random access of the stored data, which requires that all operations for one block are performed as a continuous sequence. Therefore, in applications that perform non-sequential operations, which requires random access, the downstream processor stores the data block in a random access memory after reading the data block from the FIFO, consuming more cycles in the transfer from FIFO to random access memory, and the random access memory consumes additional chip resources.

In at least some embodiments of the subject disclosure, an integrated circuit includes a random access memory shared between an upstream processor and a downstream processor, a read counter storing a value representing a number of accessible blocks of data stored in the memory, and a write counter storing a value representing a number of pages of the memory available for recording. In at least some embodiments, the read counter is in direct communication with the downstream processor so that the read counter is readable by the downstream processor without consuming any additional clock cycles in waiting to determine whether the next data block is ready for processing. In at least some embodiments, the write counter is in direct communication with the upstream processor so that the write counter is readable by the upstream processor without consuming any additional clock cycles in waiting to determine whether the memory has an available page for storing the next data block.

Figure 4:
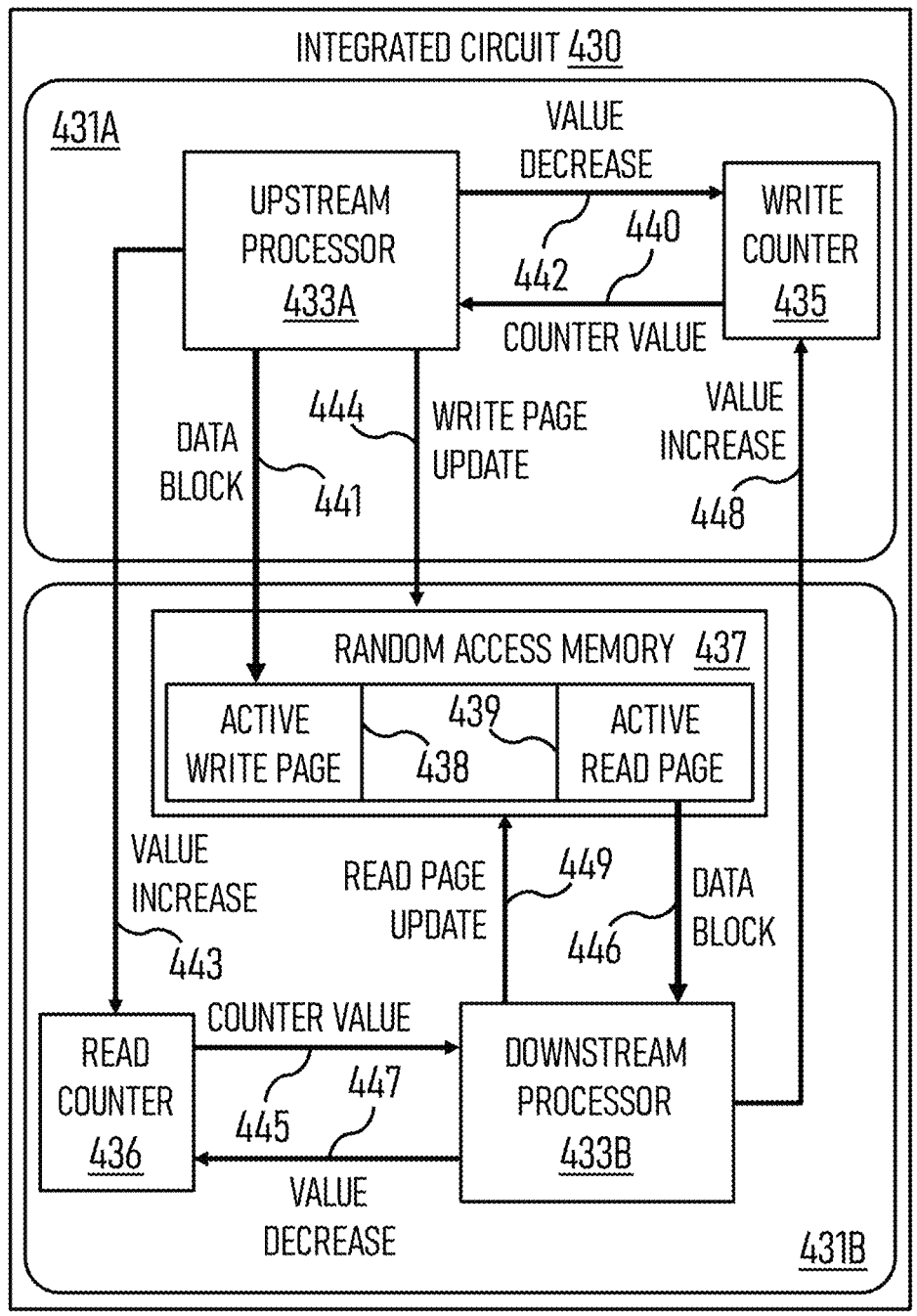
FIG. 4 is a schematic diagram of an integrated circuit utilizing paged buffering for data stream processing, according to at least some embodiments of the present invention.

FIG. 4 is a schematic diagram of an integrated circuit 430 utilizing paged buffering, according to at least some embodiments of the present invention. Integrated circuit 430 includes an upstream processing section 431A and a downstream processing section 431B. Upstream processing section 431A includes an upstream processor 433A and a write counter 435. Downstream processing section 431B includes a downstream processor 433B, a read counter 436, and a random access memory (RAM) 437.

Upstream processor 433A is configured to communicate with write counter 435, read counter 436, and RAM 437. In at least some embodiments, upstream processor 433A is configured to retrieve a counter value 440 from write counter 435. In at least some embodiments, upstream processor 433A is configured to output a data block 441, and to record data block 441 to RAM 437 in response to counter value 440 being a value greater than zero. In at least some embodiments, upstream processor 433A is configured to perform upstream operations in response to determining that write counter 435 includes a value indicating at least one page of the memory is available for recording. In at least some embodiments, upstream processor 433A is configured to perform upstream operations including recording block of data 441 to active write page 438 among the at least three pages of memory 437. In at least some embodiments, upstream processor 433A is configured to record block of data 441 to active write page 438 among the at least three pages of memory 437 while downstream processor 433B reads block of data 446 recorded to active read page 439 of memory 437. In at least some embodiments, upstream processor 433A is configured to transmit a value decrease instruction 442 to write counter 435 and a value increase instruction 443 to read counter 436. In at least some embodiments, upstream processor 433A is configured to perform operations including adjusting write counter 435 in response to beginning the recording of block of data 441 to indicate a page occupy. In at least some embodiments, upstream processor 433A is configured to perform operations including adjusting read counter 436 further in response to completing the recording of block of data 441 to indicate a page occupy. In at least some embodiments, these value increase/decrease instructions cause the respective counters to adjust, such as to change an internally stored value accordingly. In at least some embodiments, upstream processor 433A is configured to transmit a write page update instruction 444 to RAM 437 in response to recording data block 441 to RAM 437. In at least some embodiments, upstream processor 433A is configured to update a write page address of memory 437 in response to completing the recording of block of data 441. In at least some embodiments, write page update instruction 444 causes RAM 437 to indicate that a page subsequent to page 438, in which data block 441 is stored, will be active for a subsequent recording operation.

Downstream processor 433B is configured to communicate with write counter 435, read counter 436, and RAM 437. In at least some embodiments, downstream processor 433B is configured to retrieve a counter value 445 from read counter 436. In at least some embodiments, downstream processor 433B is configured to read data block 446 from RAM 437 in response to counter value 445 being a value greater than zero. In at least some embodiments, downstream processor 433B is configured to perform downstream operations in response to determining that read counter 436 includes a value indicating at least one accessible block of data is stored in the memory. In at least some embodiments, downstream processor 433B is configured to perform downstream operations including reading block of data 446 recorded to active read page 439 of memory 437. In at least some embodiments, downstream processor 433B is configured to transmit a value decrease instruction 447 to read counter 436 and a value increase instruction 448 to write counter 435 in response to reading data block 446 from RAM 437. In at least some embodiments, downstream processor 433B is configured to perform downstream operations including adjusting read counter 436 in response to beginning the reading of block of data 446 to indicate a page release. In at least some embodiments, downstream processor 433B is configured to process block of data 446. In at least some embodiments, downstream processor 433B is configured to perform downstream operations including adjusting write counter 435 further in response to completing the reading of block of data 446 to indicate a page release. In at least some embodiments, these value increase/ decrease instructions cause the respective counters to adjust, such as to change an internally stored value accordingly. In at least some embodiments, downstream processor 433B is configured to transmit a read page update instruction 449 to RAM 437 in response to reading data block 446 from RAM 437. In at least some embodiments, downstream processor 433B is configured to update a read page address of memory 437 in response to completing the reading of block of data 446. In at least some embodiments, read page update instruction 449 causes RAM 437 to indicate that a page subsequent to page 439, from which data block 446 was read, will be active for a subsequent reading operation.

Write counter 435 is within upstream processing section 431A, and is configured to communicate with upstream processor 433A and downstream processor 433B. In at least some embodiments, write counter 435 is a counter configured to store a single value, such as counter value 440. In at least some embodiments, write counter 435 is a write counter storing counter value 440 indicating whether any pages of memory 437 are available for recording. In at least some embodiments, write counter 435 is configured to respond to instructions to change the stored value accordingly, such as value decrease instruction 442 and value increase instruction 448. In at least some embodiments, write counter 435 is configured to respond to requests to read the stored value by transmitting the stored value. In at least some embodiments, write counter 435 is in direct communication with upstream processor 433A, and is readable by upstream processor 433A without consuming any additional clock cycles in waiting to determine whether RAM 437 has an available page for storing data block 441. In at least some embodiments, write counter 435 is considered local to upstream processor 433A because write counter 435 is quickly readable by upstream processor 433A, and is considered remote from downstream processor 433B.

Read counter 436 is within downstream processing section 431B, and is configured to communicate with upstream processor 433A and downstream processor 433B. In at least some embodiments, read counter 436 is a counter configured to store a single value, such as counter value 445. In at least some embodiments, read counter 436 is a read counter storing counter value 445 indicating whether any accessible blocks of data are stored in memory 437. In at least some embodiments, read counter 436 is configured to respond to instructions to change the stored value accordingly, such as value decrease instruction 447 and value increase instruction 443. In at least some embodiments, read counter 436 is configured to respond to requests to read the stored value by transmitting the stored value. In at least some embodiments, read counter 436 is in direct communication with downstream processor 433B, and is readable by downstream processor 433B without consuming any additional clock cycles in waiting to determine whether RAM 437 has a page storing data block 446 ready for reading. In at least some embodiments, read counter 436 is considered local to downstream processor 433B because read counter 436 is quickly readable by downstream processor 433B, and is considered remote from upstream processor 433A.

RAM 437 is in communication with upstream processor 433A and downstream processor 433B. In at least some embodiments, RAM 437 is configured to allow reading and writing of data in any order, to enable upstream processor 433A to record data of data block 441 as the data is output, and to enable downstream processor 433B to read data of data block 446 as the data is required by a processing algorithm. In at least some embodiments, RAM 437 includes at least three pages. In other words, in at least some embodiments, RAM 437 includes sufficient capacity to store at least three data blocks, such as data block 441 and data block 446. In at least some embodiments, the capacity of a page is large enough to store a maximum size of data block according to a processing algorithm executed by integrated circuit 430. In at least some embodiments, RAM 437 is a random access memory having at least three pages, the memory configured to store a block of data in each page among the at least three pages. In at least some embodiments, RAM 437 is configured to indicate one page as active for reading and one different page as active for writing. In at least some embodiments, RAM 437 is configured to change the active read page indication or the active write page indication in response to instruction.

In at least some embodiments of the subject disclosure, an integrated circuit includes a processor configured to process data while reading unprocessed data from an upstream random access memory and recording processed data to a downstream random access memory. Such embodiments include a read counter storing a value representing a number of accessible blocks of data stored in the upstream memory, and a write counter storing a value representing a number of pages of the downstream memory available for recording. In at least some embodiments, the read counter and the write counter are in direct communication with the processor so that the read counter and the write counter are readable by the processor within one clock cycle to determine whether both the upstream memory is ready for reading and the downstream memory is ready for recording.

Figure 5:
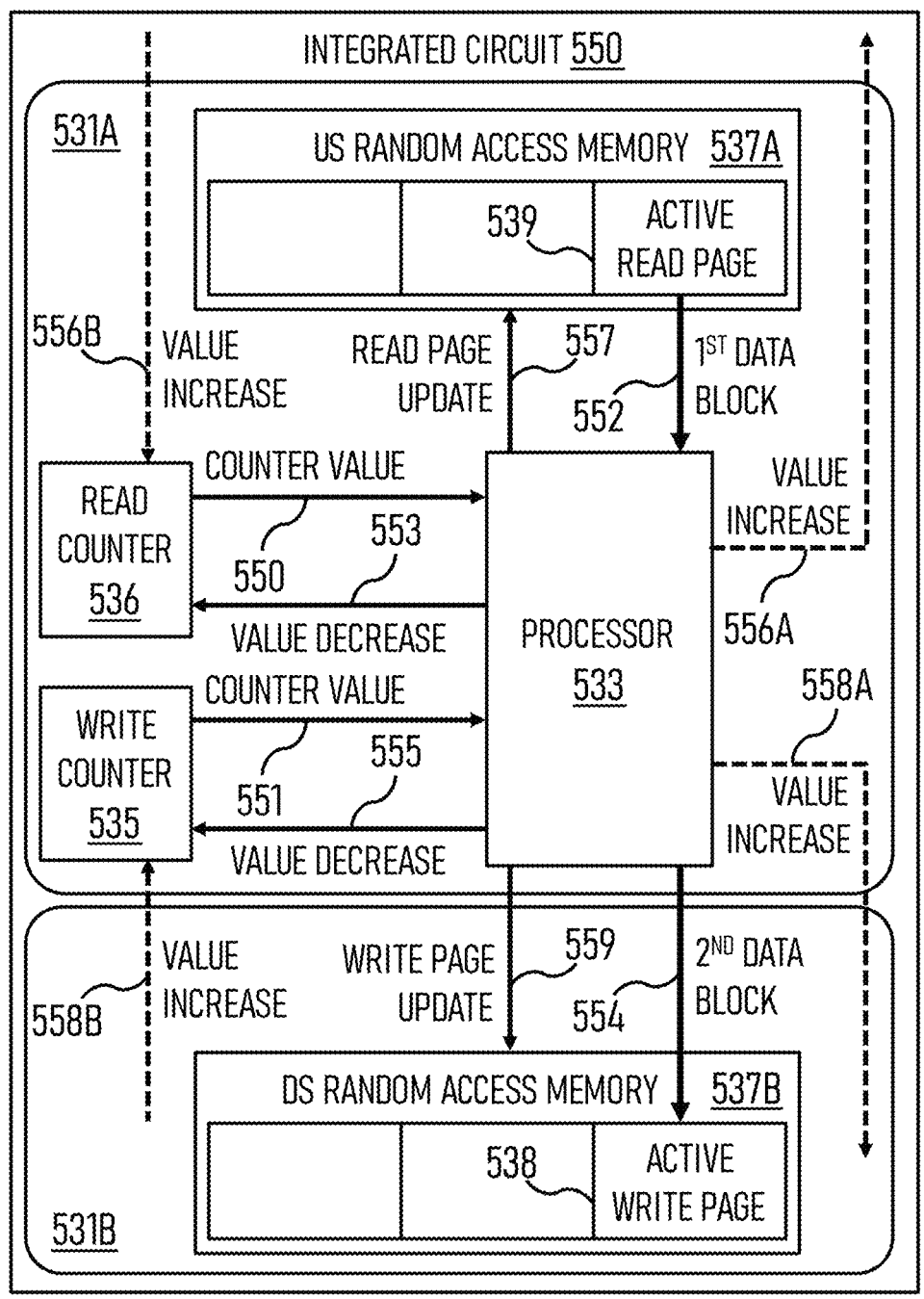
FIG. 5 is a schematic diagram of another integrated circuit utilizing paged buffering for data stream processing, according to at least some embodiments of the present invention.

FIG. 5 is a schematic diagram of another integrated circuit utilizing paged buffering, according to at least some embodiments of the present invention. Integrated circuit 550 includes an upstream processing section 531A and a downstream processing section 531B. Upstream processing section 531A includes a processor 533, a write counter 535, a read counter 536, and an upstream RAM 537A. Downstream processing section 531B includes a downstream RAM 537B.

Processor 533 is in communication with write counter 535, read counter 536, upstream RAM 537A, and downstream RAM 537B. In at least some embodiments, processor 533 is a processor, microprocessor, programmable logic circuitry, etc., configured to retrieve a counter value 550 from read counter 536 and a counter value 551 from write counter 535. In at least some embodiments, processor 533 is configured to read first data block 552 from upstream RAM 537A, perform operations to process first data block 552 to produce second data block 554, and record second data block 554 to downstream RAM 537B, all in response to counter value 550 being a value greater than zero and counter value 551 also being a value greater than zero. In at least some embodiments, a condition in which counter value 550 is a value greater than zero indicates to processor 533 that upstream RAM 537A has at least one data block ready to be read. In at least some embodiments, processor 533 is configured to perform operations in response to determining that read counter 536 includes a value indicating at least one accessible block of data is stored in the upstream memory and write counter 535 includes a value indicating at least one downstream page of the downstream memory is available for recording. In at least some embodiments, processor 533 is configured to perform operations including reading first block of data 552 recorded to upstream memory 537A. In at least some embodiments, a condition in which counter value 551 is a value greater than zero indicates to processor 533 that downstream RAM 537B has at least one data block available for recording. In at least some embodiments, processor 533 is configured to transmit a value decrease instruction 553 to read counter 536 and a value increase instruction 556A to an upstream write counter. In at least some embodiments, processor 533 is configured to perform operations including adjusting read counter 536 to indicate a page release. In at least some embodiments, processor 533 is configured to adjust a remote write counter in response to completing the reading of first block of data 552 to indicate a page release. In at least some embodiments, processor 533 is configured to perform operations including processing first block of data 522 to produce second block of data 554. In at least some embodiments, processor 533 is configured to perform operations including recording second block of data 554 to downstream memory 537B. In at least some embodiments, processor 533 is configured to transmit a value decrease instruction 555 to write counter 535 and a value increase instruction 558A to a downstream read counter. In at least some embodiments, processor 533 is configured to decrease write counter 535. In at least some embodiments, processor 533 is configured to adjust a remote read counter in response to completing the recording of second block of data 554 to indicate a page occupy. In at least some embodiments, these value increase/decrease instructions cause the respective counters to adjust, such as to change an internally stored value accordingly. In at least some embodiments, processor 533 is configured to transmit a read page update instruction 557 to upstream RAM 537A in response to reading first data block 552 from upstream RAM 537A. In at least some embodiments, processor 533 is configured to update a read page address of upstream memory 537A in response to completing the reading of first block of data 552. In at least some embodiments, read page update instruction 557 causes upstream RAM 537A to indicate that a page subsequent to page 539, from which first data block 552 was read, will be active for a subsequent reading operation. In at least some embodiments, processor 533 is configured to transmit a write page update instruction 559 to downstream RAM 537B in response to recording second data block 554 to downstream RAM 537B. In at least some embodiments, processor 533 is configured to update a write page address of downstream memory 537B in response to completing the recording of second block of data 554. In at least some embodiments, write page update instruction 559 causes downstream RAM 537B to indicate that a page subsequent to page 538, in which second data block 554 is stored, will be active for a subsequent recording operation.

Write counter 535 is within upstream processing section 531A, and is configured to communicate with processor 533. In at least some embodiments, write counter 535 is a counter configured to store a single value, such as counter value 551. In at least some embodiments, write counter 535 is configured to respond to instructions to change the stored value accordingly, such as value decrease instruction 555 and value increase instruction 558B. In at least some embodiments, write counter 535 is configured to respond to requests to read the stored value by transmitting the stored value. In at least some embodiments, write counter 535 is in direct communication with processor 533, and is readable by processor 533 within one clock cycle to determine whether downstream RAM 537B has an available page for storing second data block 554. In at least some embodiments, write counter 535 is considered local to processor 533 because write counter 535 is quickly readable by processor 533, and is considered remote from processors of other sections, such as downstream section 531B. In at least some embodiments, write counter 535 is a local write counter configured to store a value indicating whether any downstream pages of downstream memory 537B are available for recording.

Read counter 536 is within upstream processing section 531A, and is configured to communicate with processor 533. In at least some embodiments, read counter 536 is a counter configured to store a single value, such as counter value 550. In at least some embodiments, read counter 536 is configured to respond to instructions to change the stored value accordingly, such as value decrease instruction 553 and value increase instruction 556B. In at least some embodiments, read counter 536 is configured to respond to requests to read the stored value by transmitting the stored value. In at least some embodiments, read counter 536 is in direct communication with processor 533, and is readable by processor 533 within one clock cycle to determine whether upstream RAM 537A has a page storing first data block 552 ready for reading. In at least some embodiments, read counter 536 is considered local to processor 533 because read counter 536 is quickly readable by processor 533, and is considered remote from processors of other sections, such as downstream section 531B. In at least some embodiments, read counter 536 is a local read counter configured to store a value indicating whether any accessible blocks of data are stored in the upstream memory 537A.

Upstream RAM 537A is in communication with processor 533. In at least some embodiments, upstream RAM 537A is configured to allow reading and writing of data in any order, and to enable processor 533 to read data of data block 552 as the data is required by a processing algorithm. In at least some embodiments, upstream RAM 537A includes at least three pages. In other words, in at least some embodiments, upstream RAM 537A includes sufficient capacity to store at least three data blocks, such as first data block 552. In at least some embodiments, upstream random access memory 537A has at least three upstream pages, upstream memory 537A configured to store a block of data in each upstream page among the at least three upstream pages. In at least some embodiments, the capacity of a page is large enough to store a maximum size of data block according to a processing algorithm executed by integrated circuit 550. In at least some embodiments, upstream RAM 537A is configured to indicate one page as active for reading and one different page as active for writing. In at least some embodiments, upstream RAM 537A is configured to change the active read page indication or the active write page indication in response to instruction, such as write page update 557 from processor 533.

Downstream RAM 537B is in communication with processor 533. In at least some embodiments, downstream RAM 537B is configured to allow reading and writing of data in any order, and to enable processor 533 to record data of second data block 554 as the data is output. In at least some embodiments, downstream RAM 537B includes at least three pages. In other words, in at least some embodiments, downstream RAM 537B includes sufficient capacity to store at least three data blocks, such as second data block 554. In at least some embodiments, downstream random access memory 537B has at least three downstream pages, downstream memory 537B configured to store a block of data in each downstream page among the at least three downstream pages. In at least some embodiments, the capacity of a page is large enough to store a maximum size of data block according to a processing algorithm executed by integrated circuit 550. In at least some embodiments, downstream RAM 537B is configured to indicate one page as active for reading and one different page as active for writing. In at least some embodiments, downstream RAM 537B is configured to change the active read page indication or the active write page indication in response to instruction, such as read page update 559 from processor 533.

Figure 6:
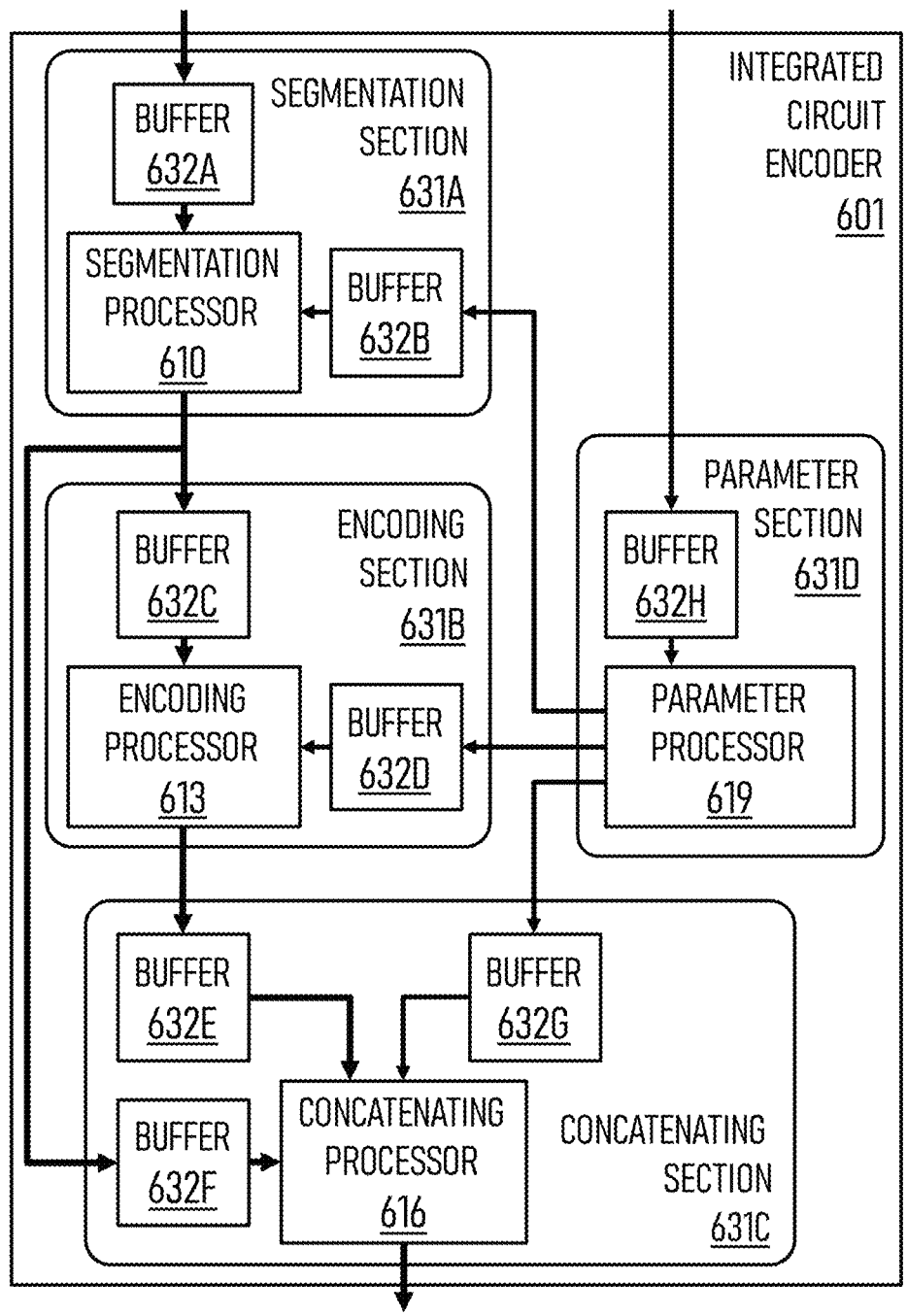
FIG. 6 is a schematic diagram of an integrated circuit encoder 601 utilizing buffers for LDPC data encoding, according to at least one embodiment of the present invention.

FIG. 6 is a schematic diagram of an integrated circuit encoder 601 utilizing buffers for LDPC data encoding, according to at least one embodiment of the present invention. Integrated circuit encoder 601 includes a segmentation section 631A, an encoding section 631B, a concatenating section 631C, and a parameter section 631D. Each of segmentation section 631A, encoding section 631B, concatenating section 631C, and parameter section 631D includes a processor and one or more buffers.

Segmentation section 631A includes buffer 632A, buffer 632B, and segmentation processor 610. In at least some embodiments, buffer 632A stores an original data block until segmentation processor 610 has completely read the original data block. In at least some embodiments, buffer 632B stores parameter values associated with segmentation of an original data block. In at least some embodiments, buffer 632B stores parameter values received from parameter processor 619 until segmentation processor 610 has completely read the parameter values associated with a given original data block.

Encoding section 631B includes buffer 632C, buffer 632D, and encoding processor 613. In at least some embodiments, buffer 632C stores data segments, which correspond to an original data block, received from segmentation processor 610 until encoding processor 613 has completely read the data segments. In at least some embodiments, buffer 632D stores parameter values associated with encoding the data segments. In at least some embodiments, buffer 632D stores parameter values received from parameter processor 619 until encoding processor 613 has completely read the parameter values associated with data segments corresponding to a given original data block.

Concatenating section 631C includes buffer 632E, buffer 632F, buffer 632G, and concatenating processor 616. In at least some embodiments, buffer 632E stores parity segments, which correspond to an original data block, received from encoding processor 613 until concatenating processor 616 has completely read the parity segments. In at least some embodiments, buffer 632F stores data segments, which correspond to the original data block, received from segmentation processor 610 until concatenating processor 616 has completely read the data segments. In at least some embodiments, buffer 632G stores parameter values associated with concatenating the data segments and the parity segments. In at least some embodiments, buffer 632G stores parameter values received from parameter processor 619 until concatenating processor 616 has completely read the parameter values associated with data segments and parity segments corresponding to a given original data block.

Parameter section 631D includes buffer 632H and parameter processor 619. In at least some embodiments, buffer 632H stores parameter values associated with encoding an original data block into an encoded data block. In at least some embodiments, buffer 632H stores parameter values until parameter processor 619 has completely read the parameter values associated with encoding a given original data block into an encoded data block. In at least some embodiments, buffer 632H stores parameter values until parameter processor 619 has completely read the parameter values for a single processor among segmentation processor 610, encoding processor 613, and concatenating processor 616 to perform respective operations associated with a given original data block. In at least some embodiments, buffer 632H stores parameter values until parameter processor 619 has completely read and converted one set of parameter values for all of segmentation processor 610, encoding processor 613, and concatenating processor 616 to perform respective operations associated with a given original data block.

Each of segmentation processor 610, encoding processor 613, concatenating processor 616, and parameter processor 619 is substantially similar in structure and function to segmentation processor 210, encoding processor 213, concatenating processor 216, and parameter processor 219 of FIG. 2, respectively.

In at least some embodiments, the buffers of some sections are FIFO units and the buffers of other sections are RAM. In at least some embodiments, the sections including RAM buffers include structures and perform functions similar to downstream processing section 431B of FIG. 4 and upstream processing section 531A of FIG. 5. In at least some embodiments, adjacent sections including RAM buffers include structures and perform functions similar to upstream processing section 431A and downstream processing section 431B of FIG. 4, respectively, and upstream processing section 531A and downstream processing section 531B of FIG. 5, respectively. For example, in at least some embodiments in which buffer 632C is a RAM buffer, segmentation section 631A includes structures and performs functions similar to upstream processing section 431A of FIG. 4 and upstream processing section 531A of FIG. 5, while encoding section 631B includes structures and performs functions similar to downstream processing section 431B of FIG. 4 and downstream processing section 531B of FIG. 5.

Figure 7:
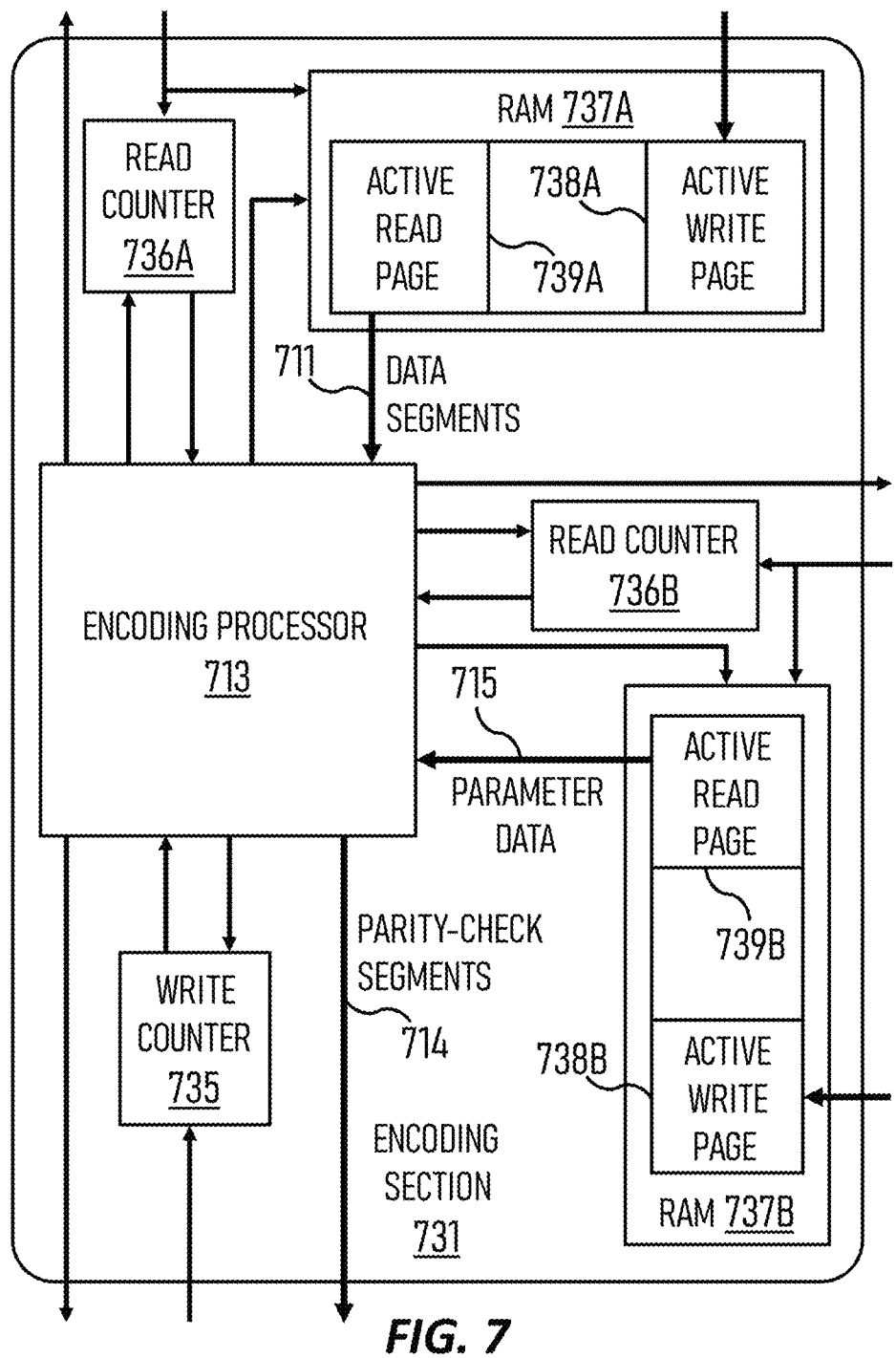
FIG. 7 is a schematic diagram of an encoding section of an integrated circuit encoder for LDPC data encoding utilizing paged buffering, according to at least one embodiment of the present invention.

FIG. 7 is a schematic diagram of an encoding section 731 of an integrated circuit encoder for LDPC data encoding utilizing paged buffering, according to at least one embodiment of the present invention. Encoding section 731 includes encoding processor 713, write counter 735, read counter 736A, read counter 736B, RAM 737A, and RAM 737B.

In at least some embodiments, read counter 736A and RAM 737A are in communication with a segmentation processor of a segmentation section. In at least some embodiments, read counter 736B and RAM 737B are in communication with a parameter processor of a parameter section. In at least some embodiments, RAM 737B is a parameter random access memory having at least three parameter pages, parameter memory 737B configured to store a block of parameter values in each parameter page among the at least three parameter pages. In at least some embodiments, read counter 736B is a local parameter read counter configured to store a value indicating whether any accessible blocks of data are stored in parameter memory 737B.

Encoding section 731 shows a detailed example in which buffer 632C and buffer 632D of FIG. 6 are RAM buffers of RAM 737A and RAM 737B, respectively. The functional interactions among encoding processor 713, write counter 735, read counter 736A, and RAM 737A are substantially similar to the functional interactions among processor 533, write counter 535, read counter 536, and upstream RAM 537A of FIG. 5, except as described below. In at least some embodiments, encoding processor 713 is configured to read data segments 711 from RAM 737A in response to a counter value read from read counter 736A being a value greater than zero. In at least some embodiments, encoding processor 713 is configured to read data segments 711 from active read page 739A of RAM 737A while a segmentation processor records data segments of a subsequent data block to active write page 738A of RAM 737A. In at least some embodiments, encoding processor 713 is configured to perform operations to process data segments 711 to produce parity check segments 714, and output parity check segments 714, all in response to a counter value read from write counter 735 being a value greater than zero. In at least some embodiments, encoding processor 713 is configured to read parameter data 715 from RAM 737B in response to a counter value read from read counter 736B being a value greater than zero. In at least some embodiments, encoding processor 713 is further configured to process data segments 711 in accordance with the block of parameter values. In at least some embodiments, encoding processor 713 is configured to read parameter data 715 from active read page 739B of RAM 737B while a parameter processor records parameter data of a subsequent data block to active write page 738B of RAM 737B. In at least some embodiments, encoding processor 713 is configured to perform operations in response to determining that read counter 736A includes a value indicating at least one accessible block of data is stored in RAM 737A, write counter 735 includes a value indicating at least one page of a downstream RAM is available for recording, and read counter 736B includes a value indicating at least one accessible block of parameter values is stored in RAM 737B. In at least some embodiments, encoding processor 713 is configured to read block of parameter values 715 recorded to parameter memory 737B. In at least some embodiments, encoding processor 713 is configured to transmit a value decrease instruction to read counter 736A and a value increase instruction to an upstream write counter. In at least some embodiments, encoding processor 713 is configured to transmit a write page update instruction to RAM 737A in response to reading data segments 711 from RAM 737A. In at least some embodiments, encoding processor 713 is configured to transmit a value decrease instruction to write counter 735 and a value increase instruction to a downstream read counter. In at least some embodiments, encoding processor 713 is configured to transmit a read page update instruction to the downstream RAM in response to recording parity check segments 714 to the downstream RAM. In at least some embodiments, encoding processor 713 is configured to transmit a single instruction received as a value increase instruction by a downstream read counter and as a read page update instruction by a downstream RAM.

Figure 8:
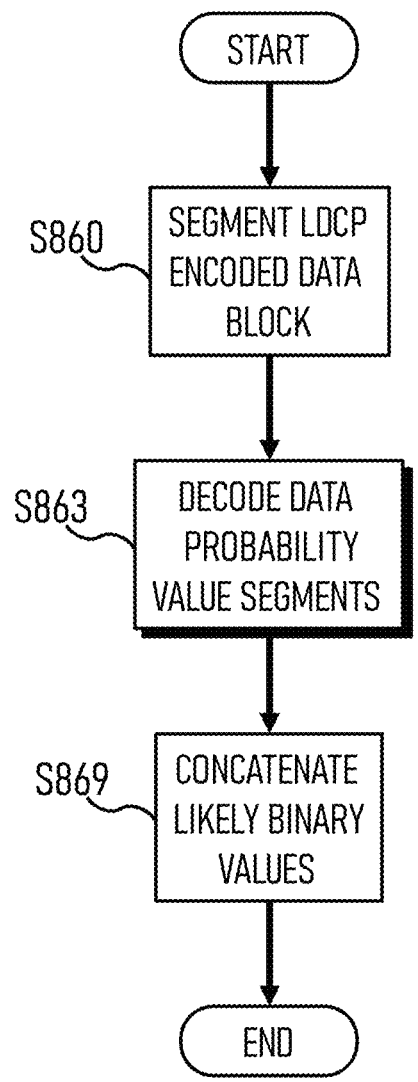
FIG. 8 is an operational flow for LDPC data decoding utilizing paged buffering, according to at least some embodiments of the present invention.

FIG. 8 is an operational flow for LDPC data decoding utilizing paged buffering, according to at least some embodiments of the present invention. The operational flow provides a method of LDPC data decoding utilizing paged buffering. In at least some embodiments, the method is performed by an integrated circuit, such as integrated circuit decoder 308 shown in FIG. 3.

At S860, a segmentation processor segments an LDCP encoded data block. In at least some embodiments, the segmentation processor segments a Low-Density Parity-Check (LDPC) encoded data block of probability values by dividing the encoded data block into a plurality of data probability value segments and a plurality of parity probability value segments, each probability value of the encoded data block representing a likelihood between binary values. In at least some embodiments, the segmentation processor divides the encoded data block into segments of one or more predetermined lengths. In at least some embodiments, the segmentation processor divides the encoded data block into segments having a length according to the length of the encoded data block. In at least some embodiments, the segmentation processor performs reverse interleaving and rate matching.

At S863, a decoding processor decodes the data probability value segments. In at least some embodiments, the decoding processor applies a parity-check matrix to the data probability value segments and the parity probability value segments to produce decoded binary value segments. In at least some embodiments, the decoding processor applies an LDPC parity-check matrix to the data probability value segments and the parity probability value segments to produce the decoded binary value segments. In at least some embodiments, the decoding processor applies one or more circular shifts to the data probability value segments and parity probability value segments according to the parity-check matrix to produce the decoded binary value segments. In at least some embodiments, the decoding processor compares binary values in a subset of values of corresponding data probability value segments and parity probability value segments to ensure that a sum total of the values is even. In at least some embodiments, the decoding processor decodes the encoded data block by adjusting, according to an iteration-variable accuracy parameter, probability values of the encoded data block based on a parity-check matrix, the parity-check matrix defining correspondence among data probability value segments and parity probability value segments, wherein the iteration-variable accuracy parameter represents a tradeoff between accuracy and computational efficiency. In at least some embodiments, the decoding processor performs the operational flow shown in FIG. 9, which will be explained hereinafter.

At S869, a concatenating processor concatenates likely binary values. In at least some embodiments, the concatenating processor concatenates the likely binary values that satisfy the parity-check matrix associated with the probability values of each data probability value segment to form a decoded data block. In at least some embodiments, the concatenating processor concatenates likely binary value segments to produce the decoded data block. In at least some embodiments, the concatenating processor concatenates likely binary value segments into a format identical to an original block of data.

Figure 9:
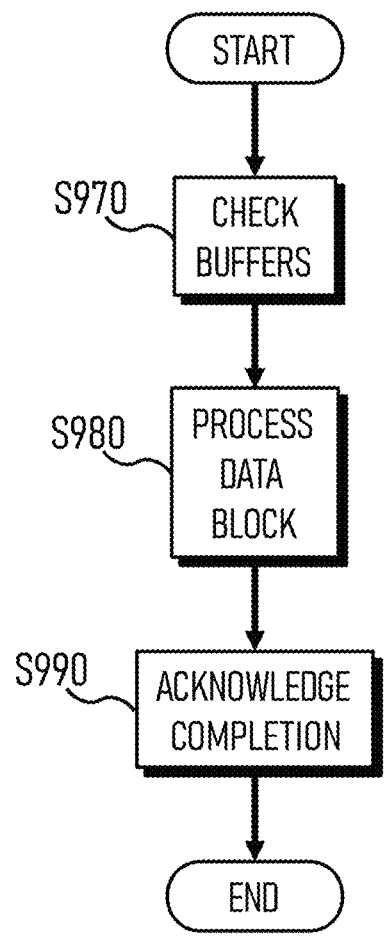
FIG. 9 is an operational flow for data probability value segment decoding utilizing paged buffering, according to at least one embodiment of the present invention.

FIG. 9 is an operational flow for data probability value segment decoding utilizing paged buffering, according to at least one embodiment of the present invention. The operational flow provides a method of data probability value segment decoding utilizing paged buffering. In at least some embodiments, the method is performed by a decoding processor, such as one of decoding processors 323 shown in FIG. 3.

At S970, the decoding processor checks buffers. In at least some embodiments, the decoding processor determines whether an upstream buffer has data probability segments of an encoded data block completely recorded and ready to be read by the decoding processor. In at least some embodiments, the decoding processor determines whether a downstream buffer has a page ready for recording likely binary values by the decoding processor. In at least some embodiments, the decoding processor determines whether a parameter buffer has parameter values for decoding the encoded data block completely recorded and ready to be read by the decoding processor. In at least some embodiments, the decoding processor performs the operational flow shown in FIG. 10, which will be explained hereinafter.

At S980, the decoding section processes the data block. In at least some embodiments, the decoding processor processes the first block of data to produce a second block of data. In at least some embodiments, the processing of the first block of data is in accordance with a block of parameter values. In at least some embodiments, the decoding processor applies a parity-check matrix to the data probability value segments and the parity probability value segments to produce decoded binary value segments. In at least some embodiments, the decoding processor applies an LDPC parity-check matrix to the data probability value segments and the parity probability value segments to produce the decoded binary value segments. In at least some embodiments, the decoding processor applies one or more circular shifts to the data probability value segments and parity probability value segments according to the parity-check matrix to produce the decoded binary value segments. In at least some embodiments, the decoding processor compares binary values in a subset of values of corresponding data probability value segments and parity probability value segments to ensure that a sum total of the values is even. In at least some embodiments, the decoding processor decodes the encoded data block by adjusting, according to an iteration-variable accuracy parameter, probability values of the encoded data block based on a parity-check matrix, the parity-check matrix defining correspondence among data probability value segments and parity probability value segments, wherein the iteration-variable accuracy parameter represents a tradeoff between accuracy and computational efficiency. In at least some embodiments, the decoding processor performs the operational flow shown in FIG. 11, which will be explained hereinafter.

At S990, the decoding section acknowledges completion. In at least some embodiments, the decoding processor issues a value increase instruction to an upstream write counter to indicate that the upstream buffer from which data probability segments were read has at least one page ready for recording. In at least some embodiments, the decoding processor issues a read page instruction to the upstream buffer to indicate that a page subsequent to the page from which data probability segments were read will be active for a subsequent reading operation. In at least some embodiments, the decoding processor issues a value increase instruction to a downstream read counter to indicate that the downstream buffer to which likely binary values were recorded is now ready to be read. In at least some embodiments, the decoding processor issues a write page instruction to the downstream buffer to indicate that a page subsequent to the page to which likely binary values were recorded will be active for a subsequent recording operation. In at least some embodiments, the decoding processor performs the operational flow shown in FIG. 12, which will be explained hereinafter.

Figure 10:
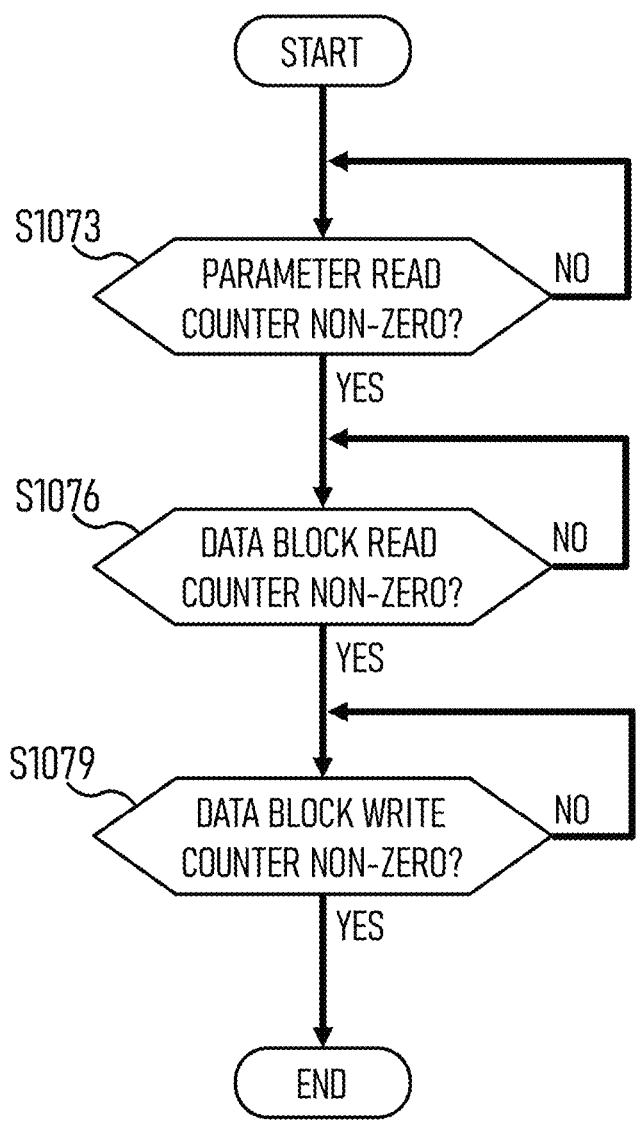
FIG. 10 is an operational flow for buffer checking, according to at least one embodiment of the present invention.

FIG. 10 is an operational flow for buffer checking, according to at least one embodiment of the present invention. The operational flow provides a method of buffer checking. In at least some embodiments, the method is performed by a decoding processor, such as one of decoding processors 323 shown in FIG. 3.

At S1073, the decoding processor determines whether a parameter read counter has a non-zero value. In at least some embodiments, the decoding processor retrieves a counter value from a parameter read counter. In response to determining that the parameter read counter does not have a non-zero value, the operational flow returns to parameter read counter determination at S1073. In response to determining that the parameter read counter has a non-zero value, the operational flow proceeds to data block read counter determination at S1076.

At S1076, the decoding processor determines whether a data block read counter has a non-zero value. In at least some embodiments, the decoding processor retrieves a counter value from a data block read counter. In response to determining that the data block read counter does not have a non-zero value, the operational flow returns to data block read counter determination at S1076. In response to determining that the data block read counter has a non-zero value, the operational flow proceeds to data block write counter determination at S1079.

At S1079, the decoding processor determines whether a write counter has a non-zero value. In at least some embodiments, the decoding processor retrieves a counter value from a data block write counter. In response to determining that the data block write counter does not have a non-zero value, the operational flow returns to data block write counter determination at S1079. In response to determining that the data block write counter has a non-zero value, the operational flow ends.

Although operations S1073, S1076, and S1079 are performed in sequence in this embodiment, these operations are performed in any order in other embodiments. In at least some embodiments, these operations are performed simultaneously.

Figure 11:
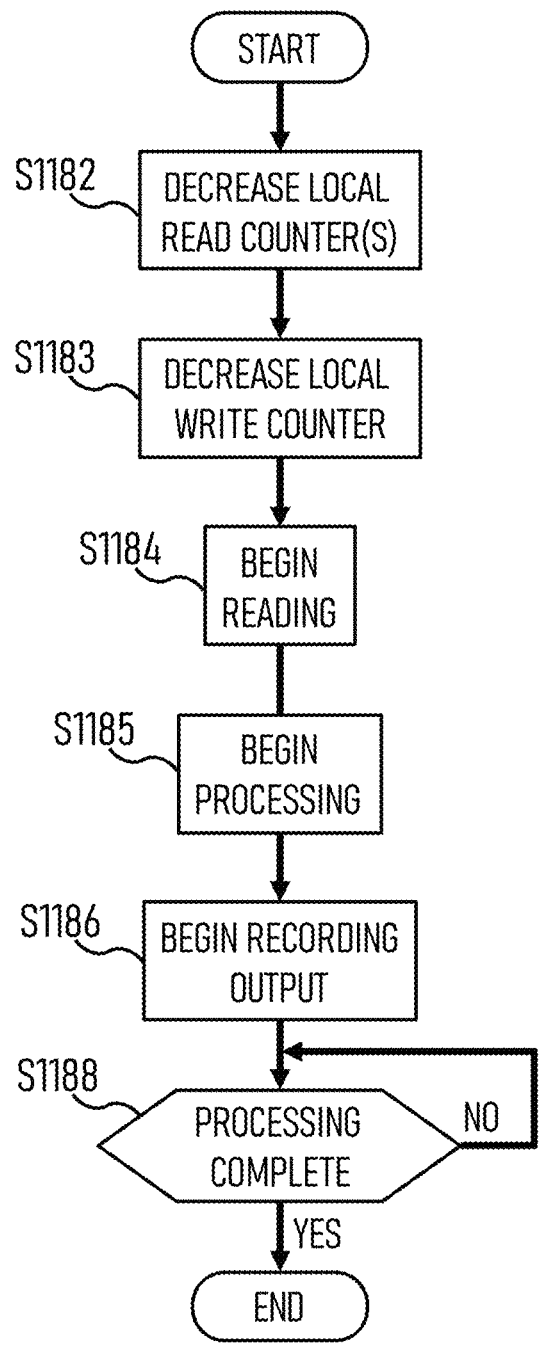
FIG. 11 is an operational flow for data block processing, according to at least one embodiment of the present invention.

FIG. 11 is an operational flow for data block processing, according to at least one embodiment of the present invention. The operational flow provides a method of data block processing. In at least some embodiments, the method is performed by a decoding processor, such as one of decoding processors 323 shown in FIG. 3. In at least some embodiments, the decoding processor performs the method in response to determining that a local read counter of the integrated circuit includes a value indicating at least one accessible block of data is stored in an upstream memory of the integrated circuit and a local write counter of the integrated circuit includes a value indicating at least one downstream page of a downstream memory of the integrated circuit is available for recording. In at least some embodiments, the decoding processor performs the method further in response to determining that a local parameter read counter of the integrated circuit includes a value indicating at least one accessible block of parameter values is stored in a parameter memory of the integrated circuit.

At S1182, the decoding processor decreases one or more local read counters. In at least some embodiments, the decoding processor adjusts the local read counter. In at least some embodiments, the decoding processor issues a value decrease instruction to a local data read counter to indicate that the upstream buffer being read has one less unread data block. In at least some embodiments, the decoding processor issues a value decrease instruction to a local parameter read counter to indicate that the parameter buffer being read has one less unread block of parameter values.

At S1183, the decoding processor decreases a local write counter. In at least some embodiments, the decoding processor adjusts the local write counter to indicate a page occupy. In at least some embodiments, the decoding processor issues a value decrease instruction to a local data write counter to indicate that the downstream buffer to which output is being recorded has one less page available for recording.

At S1184, the decoding processor begins reading. In at least some embodiments, the decoding processor reads a first block of data recorded to the upstream memory. In at least some embodiments, the decoding processor begins reading a first data block from an upstream buffer and parameter values from a parameter buffer. In at least some embodiments, the decoding processor reads a block of parameter values recorded to the parameter random access memory. In at least some embodiments, the decoding processor begins reading a first data block of data probability value segments and parity probability value segments.

At S1185, the decoding processor begins processing. In at least some embodiments, the decoding processor begins processing the first data block to produce a second data block. In at least some embodiments, the decoding processor reads portions of the first data block while processing other portions of the first data block. In at least some embodiments, the decoding processor re-reads portions of the first data block and the parameter values. In at least some embodiments, the decoding processor reads all the parameter values first, and then begins reading and processing the first data block.

At S1186, the decoding processor begins recording output. In at least some embodiments, the decoding processor records, by the processor, the second block of data to a downstream memory of the integrated circuit. In at least some embodiments, the decoding processor begins recording a second data block to a downstream buffer. In at least some embodiments, the decoding processor begins recording a second data block of likely binary values. In at least some embodiments, the decoding processor begins recording a second data block to a downstream buffer in response to beginning to process a first data block read from an upstream buffer. In at least some embodiments, the decoding processor overwrites portions of the second data block that have already been recorded in response to processing updated data. In at least some embodiments, the decoding processor records portions of a second data block while processing portions of a first data block.

At S1188, the decoding processor determines whether processing is complete. In at least some embodiments, the decoding processor continues reading and recording output until processing is complete. In at least some embodiments, the decoding processor determines that processing is complete in response to performing each of a set of tasks. In at least some embodiments, the decoding processor determines that processing is complete in response to likely binary values associated with probability values satisfying a parity-check matrix. In at least some embodiments, the decoding processor determines that processing is complete in response to performing a threshold number of decoding iterations. In response to determining that processing is not complete, the operational flow returns to process completion determination at S1188. In response to determining that processing is complete, the operational flow ends.

Figure 12:
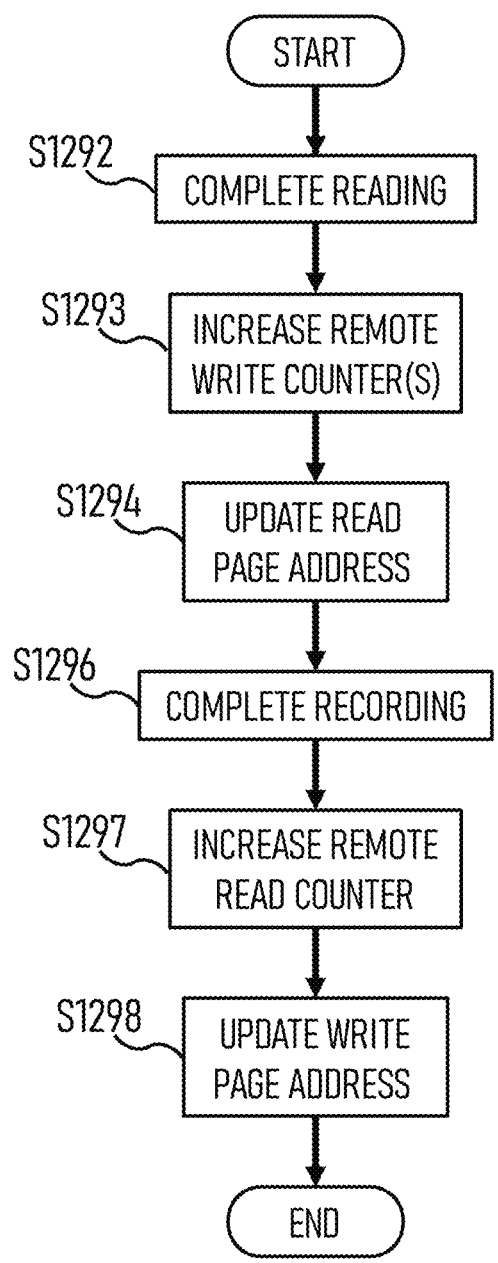
FIG. 12 is an operational flow for completion acknowledgement, according to at least one embodiment of the present invention.

FIG. 12 is an operational flow for completion acknowledgement, according to at least one embodiment of the present invention. The operational flow provides a method of acknowledging completion. In at least some embodiments, the method is performed by a decoding processor, such as one of decoding processors 323 shown in FIG. 3.

At S1292, the decoding processor completes reading. In at least some embodiments, the decoding processor determines that decoding a data block requires no further reading of data from an upstream buffer. In at least some embodiments, the decoding processor determines that no further reading of parameter values is required.

At S1293, the decoding processor increases one or more remote write counters. In at least some embodiments, the decoding processor adjusts a remote write counter in response to completing the reading of the first block of data to indicate a page release. In at least some embodiments, the decoding processor issues a value increase instruction to an upstream write counter to indicate that the upstream buffer from which data probability segments were read has one more page ready for recording.

At S1294, the decoding processor updates a read page address. In at least some embodiments, the decoding processor updates a read page address of the upstream memory in response to completing the reading of the first block of data. In at least some embodiments, the decoding processor issues a read page update instruction to the upstream buffer to indicate that a page subsequent to the page from which the first data block was read will be active for a subsequent reading operation.

At S1296, the decoding processor completes recording. In at least some embodiments, the decoding processor determines that all likely binary values have been recorded to a downstream buffer.

At S1297, the decoding processor increases a remote read counter. In at least some embodiments, the decoding processor adjusts a remote read counter in response to completing the recording of the second block of data to indicate a page occupy. In at least some embodiments, the decoding processor issues a value increase instruction to a downstream read counter to indicate that the downstream buffer to which likely binary values were recorded has one more page ready to be read.

At S1298, the decoding processor updates a write page address. In at least some embodiments, the decoding processor updates a write page address of the downstream memory in response to completing the recording of the second block of data. In at least some embodiments, the decoding processor issues a write page update instruction to the downstream buffer to indicate that a page subsequent to the page in which the second data block is stored will be active for a subsequent recording operation.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

In at least some embodiments, integrated circuit data stream processing utilizing paged buffering is performed by an integrated circuit that includes an upstream random access memory, a local read counter, a downstream random access memory, a local write counter, and a processor. The local read counter is configured to store a value indicating whether any accessible blocks of data are stored in the upstream memory. The local write counter is configured to store a value indicating whether any downstream pages of the downstream memory are available for recording. The processor is configured to adjust the local read counter to indicate a page release, adjust the local write counter to indicate a page occupy, read a first block of data recorded to the upstream memory, process the first block of data to produce a second block of data, and record the second block of data to the downstream memory.

The foregoing outlines features of several embodiments so that those skilled in the art would better understand the aspects of the present disclosure. Those skilled in the art should appreciate that this disclosure is readily usable as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that various changes, substitutions, and alterations herein are possible without departing from the spirit and scope of the present disclosure.

What is claimed is:

1. An integrated circuit comprising:
an upstream random access memory having at least three upstream pages, the upstream memory configured to store a block of data in each upstream page among the at least three upstream pages;
a local read counter configured to store a value indicating whether any accessible blocks of data are stored in the upstream memory;
a downstream random access memory having at least three downstream pages, the downstream memory configured to store a block of data in each downstream page among the at least three downstream pages;
a local write counter configured to store a value indicating whether any downstream pages of the downstream memory are available for recording;
a processor configured to perform operations in response to determining that the local read counter includes a value indicating at least one accessible block of data is stored in the upstream memory and the local write counter includes a value indicating at least one downstream page of the downstream memory is available for recording, the operations including: adjusting the local read counter to indicate a page release, adjusting the local write counter to indicate a page occupy, reading a first block of data recorded to the upstream memory, processing the first block of data to produce a second block of data, and recording the second block of data to the downstream memory.

2. The integrated circuit of claim 1,
wherein the processor is further configured to adjust a remote write counter in response to completing the reading of the first block of data to indicate a page release; and
wherein the processor is further configured to adjust a remote read counter in response to completing the recording of the second block of data to indicate a page occupy.

3. The integrated circuit of claim 1,
wherein the processor is further configured to update a read page address of the upstream memory in response to completing the reading of the first block of data; and
wherein the processor is further configured to update a write page address of the downstream memory in response to completing the recording of the second block of data.

4. The integrated circuit of claim 1, further comprising:
a parameter random access memory having at least three parameter pages, the parameter memory configured to store a block of parameter values in each parameter page among the at least three parameter pages;
a local parameter read counter configured to store a value indicating whether any accessible blocks of parameter values are stored in the parameter memory;
wherein the processor is further configured to perform the operations further in response to determining that the local parameter read counter includes a value indicating at least one accessible block of parameter values is stored in the parameter memory;
wherein the operations further include reading the block of parameter values recorded to the parameter memory; and
wherein the processor is further configured to process the first block of data in accordance with the block of parameter values.

5. The integrated circuit of claim 4, wherein
the processor is a segmentation processor configured to divide an original block of data of the first block of data into a plurality of data segments among the second block of data of one or more predetermined lengths defined by the block of parameter values.

6. The integrated circuit of claim 4, wherein
the processor is an encoding processor configured to apply a parity-check matrix among the block of parameter values to a plurality of data segments among the first block of data to produce parity segments among the second block of data.

7. The integrated circuit of claim 4, wherein
the processor is a concatenating processor configured to concatenate a plurality of data segments among the first block of data with a plurality of parity segments to produce an encoded data block of the second block of data.

8. The integrated circuit of claim 4, wherein
the processor is a segmentation processor configured to divide an encoded block of data probability values of the first block of data into a plurality of data probability value segments among the second block of data and a plurality of parity probability value segments among the second block of data of one or more predetermined lengths defined by the block of parameter values.

9. The integrated circuit of claim 4, wherein
the processor is a decoding processor configured to adjust probability values of an encoded data block of the first block of data based on a parity-check matrix among the block of parameter values to produce likely binary values among the second block of data.

10. The integrated circuit of claim 4, wherein
the processor is a concatenating processor configured to concatenate a plurality of decoded binary value segments among the first block of data to produce a decoded data block of the second block of data.

11. An integrated circuit comprising:
a random access memory having at least three pages, the memory configured to store a block of data in each page among the at least three pages;
a read counter storing a value indicating whether any accessible blocks of data are stored in the memory;
a write counter storing a value indicating whether any pages of the memory are available for recording;
an upstream processor configured to perform upstream operations in response to determining that the write counter includes a value indicating at least one page of the memory is available for recording, the upstream operations including:
adjusting the write counter to indicate a page occupy,
recording a first block of data to a first page among the at least three pages of the memory, and
adjusting the read counter further in response to completing the recording of the first block of data to indicate a page occupy;
a downstream processor configured to perform downstream operations in response to determining that the read counter includes a value indicating at least one accessible block of data is stored in the memory, the downstream operations including:
adjusting the read counter to indicate a page release,
reading the first block of data recorded to the first page of the memory,
processing the first block of data, and
adjusting the write counter further in response to completing the reading of the first block of data to indicate a page release.

12. The integrated circuit of claim 11,
wherein the upstream processor is further configured to record a second block of data to a second page among the at least three pages of the memory while the downstream processor reads the first block of data recorded to the first page of the memory.

13. The integrated circuit of claim 11,
wherein the upstream processor is in direct communication with the write counter; and
wherein the downstream processor is in direct communication with the read counter.

14. The integrated circuit of claim 11,
wherein the upstream processor is further configured to update a write page address of the memory in response to completing the recording of the first block of data; and wherein the downstream processor is further configured to update a read page address of the memory in response to completing the reading of the first block of data.

15. The integrated circuit of claim 14, wherein
the upstream processor is a segmentation processor configured to divide an original block of data into a plurality of data segments among the second block of data, and
the downstream processor is an encoding processor configured to apply a parity-check matrix to a plurality of data segments among the first block of data to produce parity segments.

16. The integrated circuit of claim 14, wherein
the upstream processor is an encoding processor configured to apply a parity-check matrix to a plurality of data segments to produce parity segments among the second block of data, and
the downstream processor is a concatenating processor configured to concatenate a plurality of data segments among the first block of data with a plurality of parity segments among the first block of data to produce an encoded data block.

17. A method comprising:
performing operations, by a processor of an integrated circuit in response to determining that a local read counter of the integrated circuit includes a value indicating at least one accessible block of data is stored in an upstream memory of the integrated circuit and a local write counter of the integrated circuit includes a value indicating at least one downstream page of a downstream memory of the integrated circuit is available for recording, the operations including:
adjusting the local read counter to indicate a page release,
adjusting the local write counter to indicate a page occupy,
reading a first block of data recorded to the upstream memory,
processing the first block of data to produce a second block of data, and
recording the second block of data to a downstream memory of the integrated circuit.

18. The method of claim 17, further comprising:
adjusting a remote write counter in response to completing the reading of the first block of data to indicate a page release; and
adjusting a remote read counter in response to completing the recording of the second block of data to indicate a page occupy.

19. The method of claim 17, further comprising:
updating a read page address of the upstream memory in response to completing the reading of the first block of data; and
updating a write page address of the downstream memory in response to completing the recording of the second block of data.

20. The method of claim 17, wherein
the operations further include reading a block of parameter values recorded to a parameter random access memory of the integrated circuit;
the performing the operations is further in response to determining that the local parameter read counter includes a value indicating at least one accessible block of parameter values is stored in the parameter memory; and
the processing of the first block of data is in accordance with the block of parameter values.

* * * * *